Patented Oct. 27, 1942

2,300,106

UNITED STATES PATENT OFFICE 2,300,106

CATALYTIC TREATMENT

Gerald C. Connolly, Baton Rouge, La., assignor to Standard Oil Development Company, a corporation of Delaware No Drawing. Application March 22, 1939,
Serial No. 263,405

2 Claims. (Cl. 196—52)

This invention relates to adsorptive gel catalysts and pertains more particularly to gel catalysts for the cracking and conversion of hydrocarbon oils.

It has previously been proposed to employ synthetic gells, such as gels composed of silica and alumina, as catalyst in the cracking of hydrocarbon oils. It has also been known that the physical structure of such adsorptive gels has an important bearing on their catalytic efficiency. For example, gels formed according to one mode of preparation may have a high order of activity whereas gels of the same chemical composition prepared in a different manner may have little or no activity.

Earlier investigations have led me to believe that to produce a synthetic silica alumina gel catalyst having a high level of efficiency for cracking oil it was essential in order to obtain an outstanding catalyst to combine the alumina with the silica while the latter was in a hydrous state such as in the form of a silica hydrosol, hydrogel, wet gelatinous precipitate or in other forms containing a high percentage of imbibed water.

I have now found that silica alumina gels having a high level of efficiency as a cracking catalyst can be produced by combining the alumina with the silica while the latter is in dry form providing the preparation of the dry silica gel is controlled to produce a silica gel having a relatively high apparent density in excess of 0.50 and preferably in excess of 0.60.

The term "apparent density" as herein employed means the weight in grams per cubic centimeter of 4 to 12 mesh granules silica gel after activation at 1000° F. Four to 12 mesh granules are those capable of passing a 4 mesh U. S. Standard sieve series screen but which will remain on a 12 mesh screen. Apparent density measurements serve to indicate the pore size of the resulting product, the higher the apparent density the smaller the size of the pores.

In accordance with the present invention I first prepare a silica gel having an apparent density above 0.50 and preferably between 0.60 and 0.70. The dry silica gel so formed is combined with alumina to form the final catalyst. The alumina may be combined with the silica gel various ways. For example, the dried silica gel may be impregnated with a solution of salt of aluminum capable of being converted either by heat or by chemical means into alumina, or the alumina may be mechanically homogenized directly with the silica gel such as by means of a ball mill or the like. In the latter case the alumina employed may be in the hydrous or non-hydrous form. The hydrous alumina may comprise for example, alumina hydrogel, alumina hydrosol, undried gelatinous precipitate or mixtures thereof. The non-hydrous alumina may comprise for example, dry alumina gel, dried gelatinous precipitate of alumina, activated alumina, pure bauxite or other types of aluminum oxide having a pronounced capillary structure.

The dried silica gel may be prepared by the conventional method wherein a solution of sodium silicate is carefully reacted with an acid under carefully controlled conditions with respect to the hydrogen ion concentration to first form a relatively clear hydrosol of silica which upon standing sets into a firm hydrogel containing a high percentage of imbibed water. The hydrogel so formed is then broken into lumps and subjected to washing treatment to remove reaction salts. The washed hydrogel is then slowly dried at relatively low temperatures such as below 300° F. until most of the water has been removed, after which it is heated to a temperature of from 800° to 1000° F. and maintained at such temperature for a period of from 3 to 6 hours to complete the drying operation and activate the gel.

The apparent density of the resulting dry gel may be controlled in various ways. For example, prolonged washing of the hydrogel or washing at elevated temperatures tends to reduce the apparent density of the product. For example, by washing with water at a temperature of 200° F. for a period of 40 hours a dried gel having an apparent density of about 0.50 may be produced. By lowering the temperature or by reducing the length of the washing treatment gels of higher apparent density may be produced.

The apparent density of the silica gel may also be modified by addition of ammonium hydroxide and other bases to the wash water employed for washing the hydrogel. Ammonium or other volatile organic bases is preferred for this purpose since they can be readily removed by volatilization whereas other types of bases such as hydroxides of the alkali metals require extensive washing to effect removal.

The amount of alumina combined with the silica may vary over a wide range without seriously affecting the cracking activity of the catalyst. For example, catalyst having a molar ratio silica to alumina of from 2½ to 1 to 40 to 1 or more have been found to have active cracking activity. Best results however have thus far been obtained from catalyst having molar ratios of silica to alumina of from 10 to 1 to 20 to 1.

While it is preferred to employ a high density true silica gel prepared as herein described as one of the components of the catalyst, dried gelatinous precipitate of silica having a high apparent density or mixtures of dried gelatinous precipitate and silica gel having a high apparent density may also be used.

While I have specifically described the preparation a two component catalyst consisting of silica and alumina it will be understood that the catalyst may also contain other modifying agents.

The following comparative tests may prove helpful to a better understanding of the invention, it being understood that the values and conditions specified are illustrative rather than limitative.

The cracking efficiency of the several catalysts described in the tests appearing hereinafter was determined under the following conditions. A vaporized East Texas gas oil of 33.8 A. P. I. gravity preheated to 850° F. is passed through a reaction zone containing the catalyst, maintained at 850° F. at a rate 0.6 volume of liquid feed per volume of catalyst per hour. The cracking operation is interrupted every two hours to regenerate the catalyst. Unless otherwise specified the catalyst is in pill form about 1 centimeter in diameter and two centimeters in length. The percentage of unstabilized liquid distillate recovered boiling below 400° F. is reported as the percentage conversion.

Test 1

Two samples of dry silica gel, one having an apparent density of 0.40 and the other having an apparent density of 0.60 when tested under the above conditions resulted in conversions of 2% and 7.5% respectively.

It is apparent from the above tests that the activity of silica gel as a cracking catalyst is improved by increasing the apparent density of the gel. One explanation for this is that the finer pores present in the higher density gel forms a more effective structure for bringing about the cracking reaction.

Test 2

Dry alumina gel having an apparent density of 0.75 when tested as described above resulted in 16% conversion.

Test 3

A series of pilled catalysts were prepared by homogenizing varying proportions of hydrous gelatinous precipitate of alumina with dry silica gel having an apparent density of 0.40 to form a mixed silica alumina gel catalysts having molar ratios of 15 to 1, 10 to 1, 5 to 1, and 2.5 to 1 respectively.

These catalysts when treated under the above conditions resulted in conversions of 16.5%, 18.0%, 21% and 21.5% respectively.

The above tests show the relative cracking efficiency of the individual components making up the catalyst and efficiency of catalysts formed from low density silica gel.

Test 4

A second series of catalysts were prepared homogenizing varying proportions of hydrous gelatinous precipitate of alumina with a dry silica gel having an apparent density of about 0.60 to form mixed silica alumina gel catalysts having molar ratios of silica to alumina of 5 to 1, 15 to 1, 20 to 1 and 30 to 1. These catalysts when tested under the conditions previously described resulted in conversion of 35%, 39%, 39% and 35% respectively.

From a comparison of tests 3 and 4 it will be seen that the cracking efficiency of the catalyst is improved over two fold in one case (15 to 1 ratio) and almost two fold in the other case (5 to 1 ratio) (in the two cases in which same relative proportions of silica and alumina were employed), by increasing the apparent density of the silica gel from 0.40 to 0.60.

Test 5

A low density silica gel having an apparent density of 0.40 was soaked in an aluminum nitrate solution dried and heated as described in test 5 to form a catalyst having an alumina content of 10% by weight. This catalyst when tested under the above conditions gave a conversion of 26.5% thus showing the effect of the density of the gel on the efficiency of the catalyst.

Test 6

Another series of catalysts were prepared by first soaking separate portions of silica gel having an apparent density of about 0.60 with solutions of aluminum nitrate of varying concentrations, and thereafter draining the separate portions and heating them to convert the nitrate to the oxide to form catalyst having an alumina content of 10%, 13%, 15% and 20% by weight. These separate catalysts when tested under the previously described conditions gave conversions of 43.5%, 49.0%, 47% and 47% respectively.

Test 7

Another set of catalyst were prepared having an aluminum oxide content of 13% and 20% by impregnating dry silica gel having an apparent density of 0.65 in the same manner as described in test 6. This catalyst when tested under conditions previously described resulted in conversions of 52.5% and 52.0% respectively.

Comparison of test 6 and 7 show that improved efficiency is obtained by increasing the apparent density.

Having thus described the preferred embodiment of the invention and given specific examples thereof, it will be understood that it embraces such other variations and modifications as come within the spirit and scope thereof.

I claim:

1. A process for cracking oils which comprises passing the oil to be cracked in contact with a catalyst formed by first preparing a dry silica gel having an apparent density of about 0.70, thereafter intimately combining alumina having a pronounced capillary structure with said dry silica gel, the ratio of silica to alumina present in the final product being between 2.5 and 40 mols of silica for each mol of alumina, and maintaining said oil in contact with said catalyst for a period sufficient to obtain substantial conversion thereof.

2. A process for the cracking of oils which comprises passing the oil to be cracked through a reaction zone containing a catalyst formed by first preparing a dry silica gel having an apparent density of about 0.70, thereafter impregnating the dry gel so formed with a solution containing a soluble salt of aluminum, controlling the concentration of said soluble salt to form a final silica-alumina product in which the ratio of silica to alumina is between 2.5 and 40 mols of silica to 1 mol of alumina, converting said salt into alumina, and maintaining said oil in contact with said catalyst for a period sufficient to obtain substantial cracking thereof.

GERALD C. CONNOLLY.